(12) United States Patent
Penkkimäki

(10) Patent No.: US 12,290,965 B2
(45) Date of Patent: May 6, 2025

(54) VENTING VALVE

(71) Applicant: WD RACING OY, Siuro (FI)

(72) Inventor: Pekka Penkkimäki, Siuro (FI)

(73) Assignee: WD RACING OY, Siuro (FI)

( * ) Notice: Subject to any disclaimer, the term of this patent is extended or adjusted under 35 U.S.C. 154(b) by 648 days.

(21) Appl. No.: 17/283,682

(22) PCT Filed: Sep. 12, 2019

(86) PCT No.: PCT/FI2019/050653
§ 371 (c)(1),
(2) Date: Apr. 8, 2021

(87) PCT Pub. No.: WO2020/074769
PCT Pub. Date: Apr. 16, 2020

(65) Prior Publication Data
US 2021/0347091 A1 Nov. 11, 2021

(30) Foreign Application Priority Data
Oct. 11, 2018 (FI) ........................... 20185850

(51) Int. Cl.
*B29C 33/10* (2006.01)
*B29D 30/06* (2006.01)

(52) U.S. Cl.
CPC .......... *B29C 33/10* (2013.01); *B29D 30/0606* (2013.01); *B29D 2030/0617* (2013.01)

(58) Field of Classification Search
CPC ........ B29D 2030/0617; B29D 30/0606; B29C 33/10
See application file for complete search history.

(56) References Cited

U.S. PATENT DOCUMENTS

2020/0130304 A1* 4/2020 Yasunaga ........... B29D 30/0606

FOREIGN PATENT DOCUMENTS

| CN | 201633153 U | * | 11/2010 | |
| CN | 206589220 U | * | 10/2017 | ............. B29C 33/10 |

(Continued)

OTHER PUBLICATIONS

International Search Report for corresponding International Patent Application No. PCT/FI2019/050653 mailed Nov. 14, 2019, 5 pages.

(Continued)

*Primary Examiner* — John J DeRusso
*Assistant Examiner* — Victoria Bartlett
(74) *Attorney, Agent, or Firm* — Merchant & Gould P.C.

(57) ABSTRACT

A venting valve (1) for removing air from a vulcanising mould of a vehicle tyre, which comprises a valve body (2) having a venting channel (12), a movable valve insert (3) arranged in the venting channel (12), which valve insert (3) comprises a valve stem (4), one end of which is provided with a valve member (5) for opening and closing the venting channel (12), and a stroke limiter (6) for limiting an opening stroke of the valve insert (3), and a spring member (7) for pressing the valve insert (3) towards an open position, in which air flow through the venting channel (12) is allowed. The stroke limiter (6) comprises a hole (8) provided with an internal thread (9), and the other end of the valve stem (4) is provided with an externally threaded portion (10), which is fastened to the internal thread (9) of the stroke limiter (6).

9 Claims, 2 Drawing Sheets

(56) References Cited

FOREIGN PATENT DOCUMENTS

Figure 7:
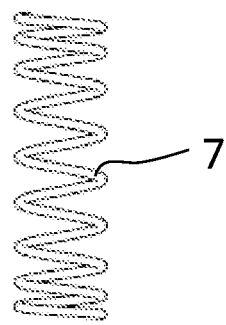

| | | |
|---|---|---|
| CN | 107877746 A | 4/2018 |
| DE | 195 43 276 C1 | 2/1997 |
| EP | 1 380 397 A2 | 1/2004 |
| FI | 106938 B | 5/2001 |
| JP | H02-214616 A | 8/1990 |
| JP | 2005-161717 A | 6/2005 |
| JP | 2006-103026 A | 4/2006 |
| KR | 10-0845093 B1 | 7/2008 |
| KR | 10-2010-0010120 A | 2/2010 |
| KR | 10-0957800 B1 | 5/2010 |
| KR | 10-2011-0052897 A | 5/2011 |
| KR | 10-1725190 B1 | 4/2017 |
| WO | WO 2009/007493 A1 | 1/2009 |
| WO | WO 2018/028414 A1 | 2/2018 |

OTHER PUBLICATIONS

Written Opinion of the International Searching Authority for corresponding International Patent Application No. PCT/FI2019/050653 mailed Nov. 14, 2019, 5 pages.
Finnish Search Report for corresponding Finnish Patent Application No. 20185850 mailed May 10, 2019, 2 pages.
Office Action of May 20, 2024 for corresponding patent application Czech Republic Application No. PV 2021-222 (2 pages).

* cited by examiner

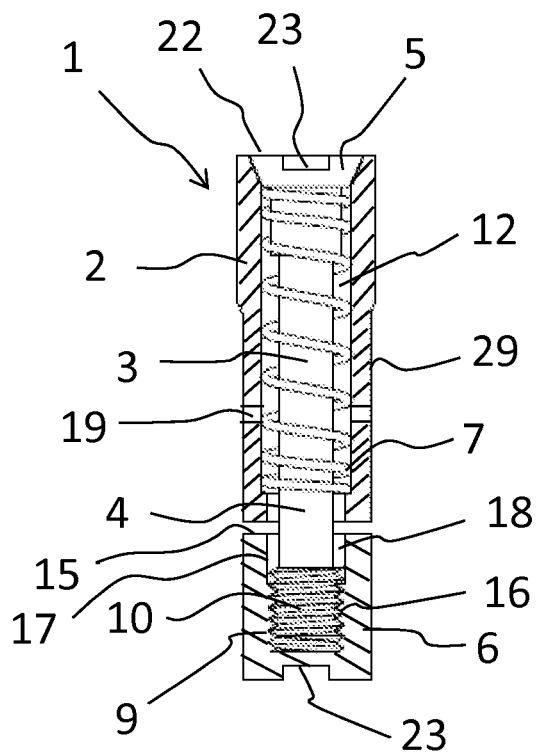
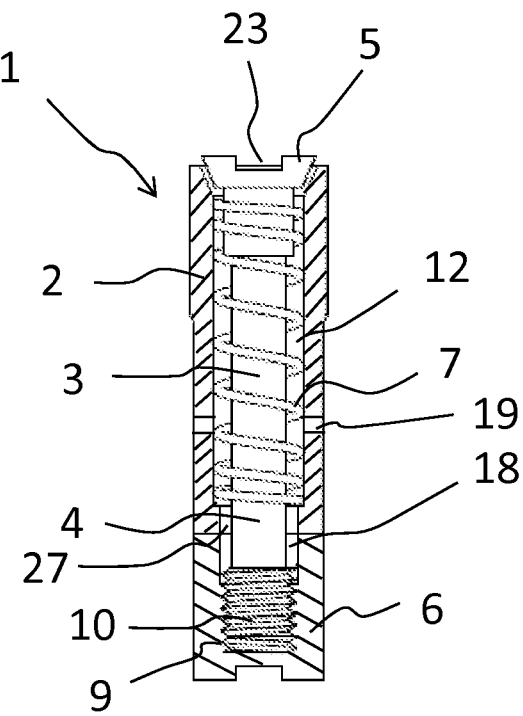
Fig. 1　　　　Fig. 2
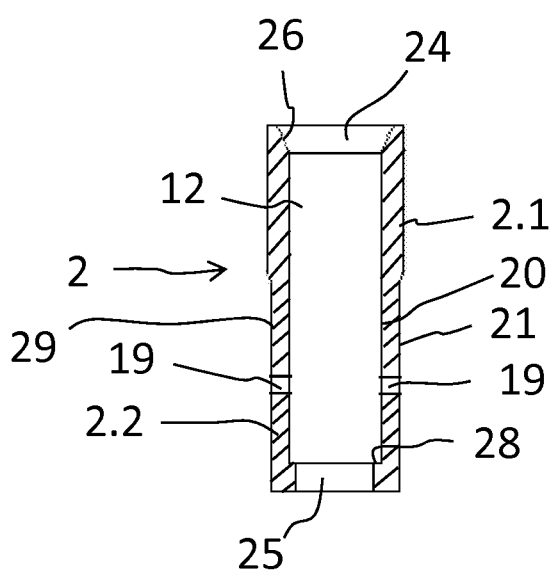
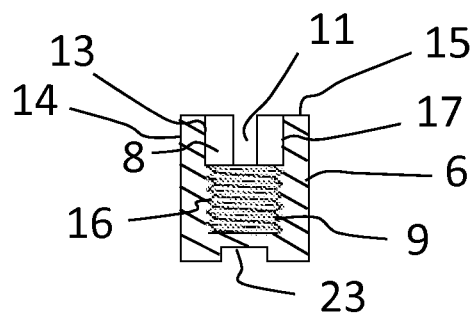
Fig. 3
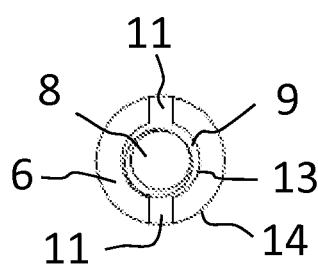
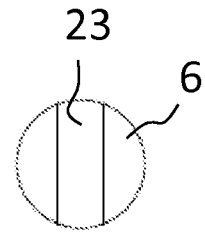
Fig. 5　　Fig. 6

VENTING VALVE

This application is a National Stage Application of PCT/FI2019/050653, filed 12 Sep. 2019, which claims benefit of Ser. No. 20/185,850, filed 11 Oct. 2018 in Finland, and which applications are incorporated herein by reference. To the extent appropriate, a claim of priority is made to each of the above disclosed applications.

The invention relates to a venting valve for removing air from a vulcanizing mould of a vehicle tyre.

In vulcanising moulds of vehicle tyres a tyre blank smaller than the inner dimensions of the mould is placed inside the mould, after which the mould is closed. After closing, the tyre blank is caused to expand, whereby it presses against the surface of the mould in its plastic state getting the size and shape of a tyre. During the vulcanizing process, air between the tyre blank and the mould surface has to be removed in order for the surface of the tyre blank to come into a tight contact with the mould surface. The vulcanizing mould comprises venting bores through which air can be removed from the space between the tyre blank and the mould surface. Typically the vulcanizing mould may comprise several hundreds or thousands of venting bores for removing air completely at each point of the mould so that no air pockets remain between the tyre and the mould. The venting bores can be equipped with venting valves which prevent tyre material from entering the venting bore.

The venting valve comprises a valve body having a venting channel and a movable valve insert arranged in the valve body. One end of the valve insert is provided with a valve disk for opening and closing the venting channel. The valve disk is pressed against a seat surface of the valve body in the closed position of the venting valve. A coil spring is arranged around the valve insert. The coil spring presses the valve disk away from the seat surface towards the interior of the vulcanizing mould and thus the open position of the venting valve. The other end of the valve insert is provided with a stroke limiter that strikes against the end of the valve body and thus limits the opening movement of the valve insert when the valve insert is moved toward an open position. As the material being vulcanised, when expanding, advances towards the mould surface, it pushes ahead of it the valve disc, which then finally presses against the seat surface and closes the venting channel, whereby the material being vulcanised cannot access the venting channel. The spring then opens the valve while the tyre blank is being removed from the mould.

A drawback of existing venting valves is that it is not possible to adjust the opening stroke length of the valve insert, and thus the amount of air to be vented through the venting valve. Since the tyre manufacturers use venting valves with multiple different lengths of opening stroke, the tyre and venting valve manufacturers must store different types of the venting valves, which often cause problems.

The object of the present invention is to provide a venting valve by means of which the above described problems can be reduced.

The object according to the invention can be achieved by a venting valve according to claim 1.

The air venting valve insert according to the invention comprises a valve body having a venting channel, a movable valve insert arranged in the venting channel, which valve insert comprises a valve stem, one end of which is provided with a valve member for opening and closing the venting channel, and a stroke limiter for limiting an opening stroke of the valve insert, and a spring member for pressing the valve insert towards an open position, in which air flow through the venting channel is allowed. The stroke limiter comprises a hole provided with an internal thread. The other end of the valve stem is provided with an externally threaded portion, which is fastened to the internal thread of the stroke limiter.

Significant advantages can be achieved by means of the invention. Since the stroke limiter is attached to end of the valve stem by means of the threaded connection, the length of the opening stroke of the valve insert can be adjusted by screwing the stroke limiter or the valve insert. Additionally, the adjustment of the opening stroke can be performed without dismantling the venting valve or removing the venting valve from the venting bore of the vulcanizing mould.

Figure 8:
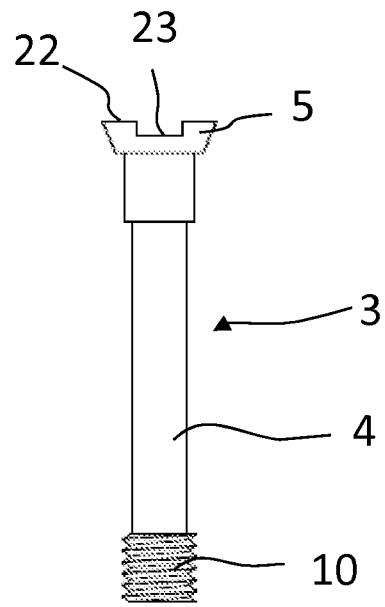
Figure 9:
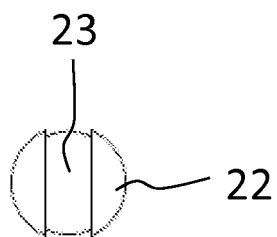

In the following, the invention will be described in more detail by means of examples with reference to the attached drawings, wherein FIGS. 1 and 2 are cross-section views of a venting valve according to an embodiment of the invention in a closed position (FIG. 1) and an open position (FIG. 2), FIG. 3 is a cross-section view of a valve body of the venting valve of FIGS. 1 and 2, FIG. 4 is a cross-section view of a stroke limiter of the venting valve of FIGS. 1 and 2, FIG. 5 is a top view and FIG. 6 is a bottom view of the stroke limiter of FIG. 4, FIG. 7 shows a spring member of the venting valve of FIGS. 1 and 2, FIG. 8 is a side view of a valve insert of the venting valve of FIGS. 1 and 2, and FIG. 9 is a top view of the valve insert of FIG. 8.

The drawings show a venting valve 1 for removing air from a vulcanizing mould of a vehicle tyre. Typically the vulcanizing mould comprises 1000-4000 venting valves 1. The venting valve 1 comprises a valve body 2, such as a valve sleeve, having a venting channel 12 through which air is removed from the vulcanizing mould. The venting channel 12 is cylindrical. The venting channel 12 extends from a first end to a second end of the valve body 2. The venting valve 1 further comprises a valve insert 3 inserted into the venting channel 12. The valve body 2 is attached to a venting bore of the vulcanizing mould e.g. by a press fit. The valve body 2 is cylindrical. The outer diameter of the valve body 2 is typically 1.5-4 mm. The first end of the valve body 2 comprises an inlet opening 24 through which air is conducted into the venting channel 12. The second end of the valve body 2 comprises an outlet opening 25 through which air is removed from the venting channel 12.

The valve insert 3 comprises a valve stem 4, one end of which is provided with a valve member 5, such as a valve disk, for opening and closing the venting channel 12 and the inlet opening 24. The valve body 2 comprises a seat surface 26 against which the valve member 5 is arranged for closing the inlet opening 24. The seat surface 26 can be conical or planar. The other end of the valve stem 4 comprises an externally threaded portion 10. The externally threaded portion 10 is fitted through the outlet opening 25.

The venting valve 1 comprises a spring member 7, such as a coil spring arranged around the valve stem, 4 for pressing the valve insert 3 towards the open position. In the open position the valve member 5 is at a distance from the seat surface 26. In the open position air flow through the venting channel 12 is allowed. In the closed position the valve member 5 is against the seat surface 26. In the closed position air flow through the venting channel 12 is prevented. The interior of the valve body 2 comprises a support surface 28 for the spring member 7. The support surface 28 surrounds the valve stem 4. The spring member 7 is arranged between the valve member 5 and the support surface 28. One end of the spring member 7 is against the valve member 5 and the other end against the support surface 28.

The valve insert 3 comprises a stroke limiter 6 for limiting the opening stroke length or opening movement of the valve insert 3. The stroke limiter 6 is provided at the end of the valve insert 3. During the opening stroke of the valve insert 3 the stroke limiter 6 hits the second end of the valve body 2, and thus limits the opening movement of the valve insert 3. The stroke limiter 6 comprises a hole 8 which is provided with an internal thread 9. The hole 8 is a blind hole. The externally threaded portion 10 of the valve stem 4 is releasably fastened to the internal thread 9 of the stroke limiter 6. The stroke limiter 6 can be fully tightened to the valve stem 4 or vise versa. The stroke limiter 6 and the valve stem 4 can be fastened and/or unfastened by a suitable tool, for example a screwdriver. The end of the stroke limiter 6 that faces away from the valve body 2 and/or a front surface 22 of the valve member 5 comprises receiving means 23, such as a hole, groove or projection, for receiving the tool by which the stroke limiter 6 or valve stem 4 can be screwed. The stroke length of the valve insert 3 can be adjusted by screwing the valve stem 4 with respect to the stroke limiter 6 or vice versa. The stroke length of the valve insert 3 is adjustable without removing the venting valve 1 from the venting bore of the vulcanizing mould.

The stroke limiter 6 is provided with at least one slot 11 for removing air from the valve body 2 when the valve insert 3 is in the open position, i.e. the stroke limiter 6 is against the second end of the valve body 2 and the valve member 5 is at a distance from the seat surface 26. The slot 11 extends from the surface 13 of the hole to the outer surface 14 of the stroke limiter 6. The slot 11 is located between the internal thread 9 and the end 15 of the stroke limiter 6 that faces the valve body 2. The slot 11 extends to the end surface of the stroke limiter 6 that faces the valve body 2. As can be seen from FIG. 5 the stroke limiter 6 comprises two slots 11 arranged on opposite sides of the hole 8.

The diameter of the hole 8 at the region of the slot 11 is larger than that of the valve stem 4 such that a venting gap 18 exists between the valve stem 4 and the surface of the hole 8. The venting gap 18 is circular. The venting gap 18 extends to the stroke limiter end 15 that faces the valve body 2. Typically the hole 8 comprises a portion 16 that is provided with the internal thread 9 and an unthreaded portion 17 between the internally threaded portion 16 and the end 15 of stroke limiter that faces the valve body 2. The slot 11 is located in the unthreaded portion 17.

A circular gap 27 is provided between the edge of the outlet opening 25 and the valve stem 4 when the valve insert 3 is in the open position. Air is removed from the venting channel 12 through the gap 27, thereafter through the venting gap 18 and through the slot 11 of the stroke limiter 6.

The side wall 29 of the valve body 2 comprises at least one venting hole 19, typically a plurality of venting holes 19, for increasing air removal from the venting channel 12. The side wall 29 is located between the first end and second end of the valve body 2. The venting hole 19 extends from the inner surface 20 of the venting channel 12 to the outer surface 21 of the valve body 2. The valve body 2 comprises an upper portion 2.1 and a lower portion 2.2. The outer diameter of the lower portion 2.2 is smaller than that of the upper portion 2.1. The venting hole 19 or venting holes 19 are located in the lower portion 2.2. Thus, air is also removed from the venting channel 12 through the venting hole(s) 19 and thereafter through the gap between the lower portion 2.2 and the surface of the venting bore of the vulcanizing mould. The venting holes 19 are arranged side by side in the circumferential direction of the valve body 2 and/or one on the other.

The length of the opening stroke of venting valve 1 is adjustable by screwing the stroke limiter 6 with respect to the valve stem 4 or vice versa.

The invention claimed is:

1. A venting valve for removing air from a vulcanising mould of a vehicle tyre, which air venting valve comprises:
    a valve body having a venting channel,
    a movable valve insert arranged in the venting channel, which valve insert comprises a valve stem, a first end of which is provided with a valve member for opening and closing the venting channel, and a stroke limiter for limiting an opening stroke of the valve insert, and
    a spring member for pressing the valve insert towards an open position, in which air flow through the venting channel is allowed,
    wherein the stroke limiter comprises a hole provided with a threaded portion comprising an internal thread, and a second end of the valve stem is provided with an externally threaded portion, which is fastened to the internal thread of the stroke limiter,
    wherein the stroke limiter comprises a slot for removing air from the venting channel when the valve insert is in the open position, and
    wherein the hole comprises an unthreaded portion located between the threaded portion and an end of the stroke limiter that faces the valve body, and the slot is located in the unthreaded portion of the hole.

2. The venting valve according to claim 1, wherein the slot extends from a surface of the hole to an outer surface of the stroke limiter.

3. The venting valve according to claim 1, wherein the slot extends from the internal thread to the stroke limiter end that faces the valve body.

4. The venting valve according to claim 1, wherein a diameter of the hole at a region of the slot is larger than that of the valve stem such that a venting gap exists between the valve stem and the surface of the hole.

5. The venting valve according to claim 4, wherein the venting gap extends to the end of the stroke limiter that faces the valve body.

6. The venting valve according to claim 1, wherein the slot extends to the end of stroke limiter that faces the valve body.

7. The venting valve according to claim 1, wherein a side wall of the valve body comprises at least one venting hole for removing air from the venting channel.

8. The venting valve according to claim 7, wherein the valve body comprises an upper portion and a lower portion having a smaller outer diameter than the upper portion, and that the venting hole is located in the lower portion.

9. The venting valve according to claim 1, wherein a stroke length of the valve insert is adjustable by screwing the stroke limiter or the valve stem.

* * * * *